Feb. 5, 1929.
J. L. SKEEHAN
1,701,086
GAUGING MECHANISM
Filed Dec. 23, 1927
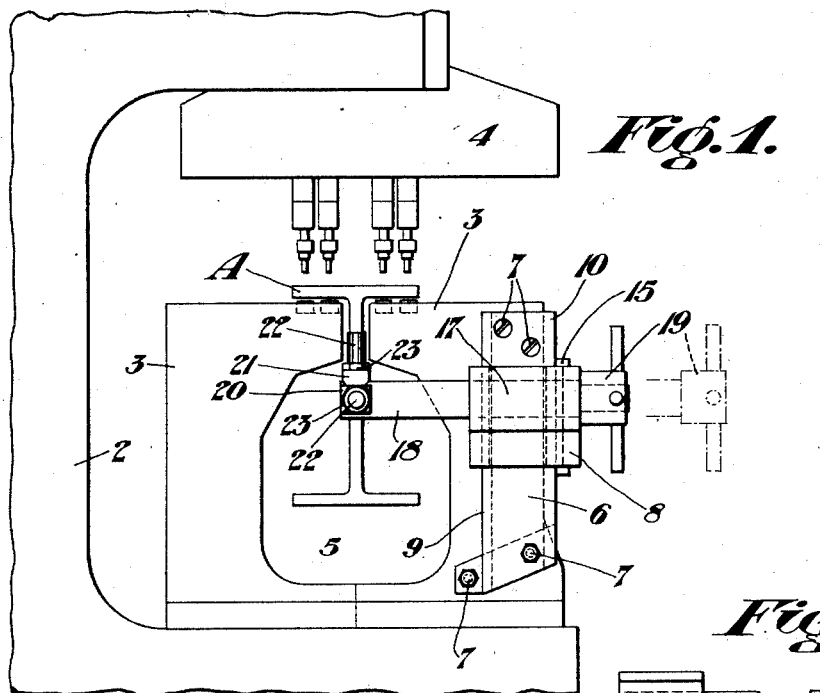
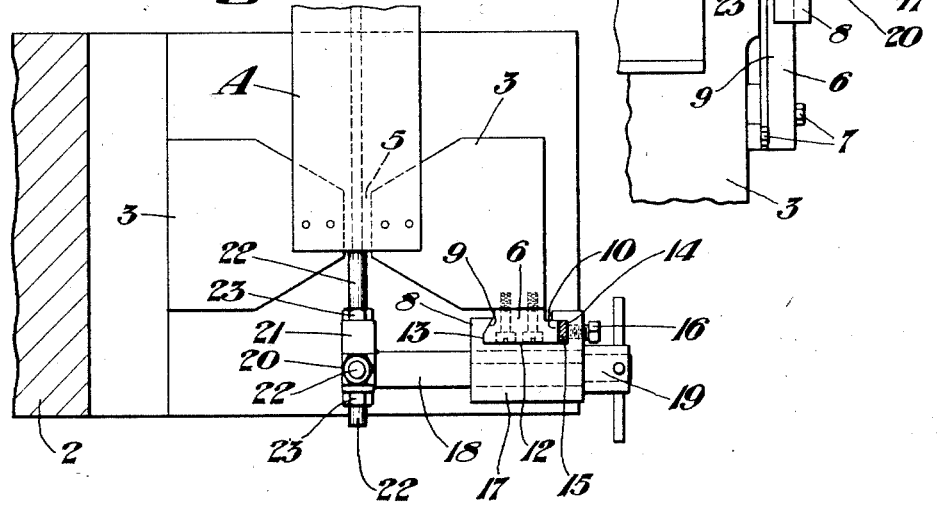
Inventor:
JOHN L. SKEEHAN,
by: D. Anthony Usina
his Attorney.

Patented Feb. 5, 1929.

1,701,086

UNITED STATES PATENT OFFICE.

JOHN L. SKEEHAN, OF BADEN, PENNSYLVANIA.

GAUGING MECHANISM.

Application filed December 23, 1927. Serial No. 242,121.

This invention relates to spacing or gauging mechanism and, while not limited thereto, relates more particularly to a gauge stop for use on metal working machines such as punches and the like, and has for its object the provision of a gauge to supplement a spacing machine and adapted to be used to gauge the first several lines of holes in a work piece.

In the usual well known operation of punching a workpiece in which a spacing machine is used to space or gauge the work piece, it is often impractical, if not impossible, to grip the work piece with the spacing carriage while punching the first several rows or lines of holes on account of the grip jaws interfering with the punch and die. Also, it is often advantageous to permit the punch machine operator to punch the first few rows of holes in the work piece while the spacing carriage operator is otherwise engaged. For instance, in removing a finished work piece or in resetting the spacing machine, or the like.

The present gauge stop permits the punching machine operator to thus operate the punching machine and to accurately gauge or space the rows of holes.

In the drawings—

Figure 1 is a side elevation of a portion of a punching machine having my invention applied thereto.

Figure 2 is a sectional plan thereof.

Figure 3 is a fragmentary detail elevation looking at the gauge head.

Referring more particularly to the drawings, the numeral 2 designates the punching machine housing or frame on which the usual die stand 3 and punch head 4 are supported. The die stand 3 has the usual throat 5 through which the workpiece A is moved or travels during the punching operation.

The gauge stop mechanism of this invention is mounted on the die stand 3 and comprises a slide bar or plate 6 which is rigidly secured to the die stand by bolts or screws 7 and is adapted to slidably support a saddle member 8.

The slide bar 6 has one side edge beveled to form a beveled guide flange 9 and has its other side edge cut away to form a square edged guide flange 10. The saddle member 8 has its rear face cut away to form guideways 12 to receive the slide bar 6, the side faces of the guideways 12 being grooved, as at 13 and 14, to receive the guide flanges 9 and 10.

A wear strip 15 is mounted in the groove 14 and set screws 16 are threaded in the saddle 8 and adapted to be threaded in against the strip 15 so as to force the strip 15 against the square flange 10 to clamp or lock the saddle 8 in its vertically adjusted position.

The saddle 8 is preferably adjusted vertically so that the gauge bars, to be described, will engage the work-piece or beam at or adjacent to its longitudinal axis. This feature is essential when the device is used with beams whose ends are not square. When both flanges of a beam are to be punched, the beam is passed through the machine once and then turned or rotated about its horizontal axis so as to present its other flange to be punched. If the end of the beam is not square, it is essential that the gauge bars contact with a neutral point, or the longitudinal axis of the beam in order to correctly gauge the punches in both flanges.

The saddle 8 is provided with a horizontal bearing portion 17 in which a bar or shaft 18 is slidably and rotatably mounted. A hand-wheel 19 is secured to the outer end of the shaft or bar 18 by which the operator may manually operate the shaft either to slide or rotate it in the bearing 17.

The inner end of the bar or shaft 18 is provided with a head 20 having a plurality of diametrically disposed tubular projections 21 thereon. The projections 21 are internally threaded to receive threaded gauge bars 22 which may be threaded in and out of the projections 21 to vary their effective gauge length, and jam-nuts 23 are provided on each of the gauge bars to lock the bars in their adjusted positions and prevent accidental displacement thereof.

The projections 21 are of varying lengths and the bars 22 are of corresponding varying lengths.

The present gauge mechanism may be used with any machine where it is desired to stop a work-piece at various points in its travel through the machine but is particularly adapted for use with a metal punching machine used to punch holes in beams and the like, which machines are generally used in connection with a spacing machine.

In operation of such machines, however, it is generally impractical to grip the work-piece with the spacing machine while punching the first several rows of holes, due to the fact that the grip jaws either overlie the points where the holes are to be punched or interfere with the operation of the punching machine.

It has, therefore, been the practice to manually space the first several rows of holes in the work-piece and, in order to facilitate this operation, the present gauge mechanism has been developed.

In operation, the bar or shaft 18 is moved inward so that the head 20 and the gauge bars 22 are in line with the work-piece. The shaft 18 is then rotated so that the longest gauge bar 22 is opposite the work-piece. The work-piece is then moved into engagement with the gauge bar 22 and the first row of holes is punched. The shaft 18 is then rotated to bring the next shorter gauge bar into line with the work-piece and the work-piece is then moved into engagement with this gauge bar and the second row of holes is punched.

This operation will be repeated until all the gauge bars 22 have been used. After all the gauge bars 22, or as many as desired, have been used the shaft 18 will be slid horizontally in the bearing 17 to retract it out of the path of travel of the work-piece and the usual spacing machine will be engaged with the work-piece to move it through the punching machine.

It will, of course, be understood that any number of spacing or gauge bars 22 may be provided instead of the three shown in the drawings, and that other changes and modifications may be made without departing from the scope of my invention as defined in the appended claims.

I claim—

1. The combination with a metal working machine, of gauge mechanism therefor, said mechanism comprising a saddle member mounted for vertical adjustment on said machine, a shaft rotatably and slidably mounted in said saddle, a gauge head on the inner end of said shaft, a plurality of gauge bars removably mounted in said head, and a hand-wheel on the other end of said shaft for reciprocating said shaft into and out of the path of the work-piece and for revolving said shaft to position the different ones of said gauge bars in line with said work-pieces.

2. The combination with a metal working machine, of gauge mechanism therefor, said mechanism comprising a saddle member mounted on the machine, a shaft rotatably and slidably mounted in said saddle, a gauge head on the inner end of said shaft, said head being provided with a plurality of diametrically arranged threaded recesses, gauge bars threaded in said recesses, means for locking said gauge bars against accidental displacement, and a hand-wheel on the other end of said shaft for reciprocating said shaft into and out of the path of the work-piece and for revolving said shaft to position the different ones of said gauge bars in line with said work-pieces.

3. The combination with a metal working machine, of gauge mechanism therefor, said mechanism comprising a saddle member mounted for vertical adjustment on said machine, means for locking said saddle in its adjusted positions, a shaft rotatably and slidably mounted in said saddle, a gauge head on the inner end of said shaft, a plurality of gauge bars removably mounted in said head, and a hand-wheel on the other end of said shaft for reciprocating said shaft into and out of the path of the work-piece and for revolving said shaft to position the different ones of said gauge bars in line with said work-piece.

4. The combination with a metal working machine, of gauge mechanism therefor, said mechanism comprising a saddle member mounted for vertical adjustment on said machine, a shaft rotatably and slidably mounted in said saddle, a gauge head on the inner end of said shaft, said head being provided with a plurality of diametrically arranged threaded recesses, gauge bars threaded in said recesses, and a hand-wheel on the other end of said shaft for reciprocating said shaft into and out of the path of the work-piece and for revolving said shaft to position the different ones of said gauge bars in line with the work-piece.

5. The combination with a metal punching machine for punching beams and the like, of a gauge stop for stopping the work-piece in predetermined punching positions, said stop comprising a slide bar rigidly mounted on the stand of said machine, a saddle member slidably mounted for vertical movement on said slide bar, means for locking said saddle in position on said slide bar, a shaft rotatably and slidably mounted in said saddle, a gauge head on the inner end of said shaft, a plurality of gauge bars removably mounted in said head, and a hand-wheel on the other end of said shaft for reciprocating said shaft into and out of the path of the work-piece and for revolving said shaft to position the different ones of said gauge bars in line with said work-piece.

In testimony whereof, I have hereunto set my hand.

JOHN L. SKEEHAN.